US006287696B1

(12) United States Patent
Noda et al.

(10) Patent No.: US 6,287,696 B1
(45) Date of Patent: *Sep. 11, 2001

(54) RESIN COMPOSITION FOR A FIBER REINFORCED COMPOSITE, A PREPREG AND A FIBER REINFORCED COMPOSITE

(75) Inventors: Shunsaku Noda; Hiroki Oosedo; Nobuaki Oki, all of Ehime (JP)

(73) Assignee: Toray Industries, Inc. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,453

(22) Filed: Apr. 21, 1998

(30) Foreign Application Priority Data

Apr. 21, 1997 (JP) .................................................. 9-103167

(51) Int. Cl.$^7$ ........................................................ B32B 9/04
(52) U.S. Cl. .................. 428/411.1; 428/366; 428/367; 428/408; 428/413; 428/423.1; 428/475.8; 428/477.7; 428/483; 428/502; 428/505; 428/506

(58) Field of Search ...................................... 428/366, 367, 428/408, 411.1, 413, 423.1, 475.8, 477.7, 483, 502, 505, 506

(56) References Cited

U.S. PATENT DOCUMENTS

| 4,532,275 | * | 7/1985 | Aito et al. | 523/468 |
| 5,413,847 | * | 5/1995 | Kishi et al. | 428/283 |
| 5,770,313 | * | 6/1998 | Furumoto et al. | 428/411.1 |

* cited by examiner

*Primary Examiner*—Helen L. Pezzuto
(74) *Attorney, Agent, or Firm*—Schnader Harrison Segal & Lewis LLP

(57) ABSTRACT

The invention provides a resin composition for a fiber reinforced composite which can be used to produce a prepreg excellent in tackiness, drapability and windability around a mandrel, and also provides a prepreg in which reinforcing fibers are impregnated with a resin composition, and a fiber reinforced composite obtained from them. The resin composition includes a thermosetting resin and a thermoplastic resin with a weight average molecular weight of 200,000 to 5,000,000.

27 Claims, No Drawings

RESIN COMPOSITION FOR A FIBER REINFORCED COMPOSITE, A PREPREG AND A FIBER REINFORCED COMPOSITE

FIELD OF THE INVENTION

The present invention relates to a resin composition for a fiber reinforced composite material which can be used to produce a prepreg that is excellent in tackiness, drapability and windability around a mandrel. The invention also relates to a prepreg produced by using the resin composition as a matrix resin and a fiber reinforced composite produced by using the prepreg.

BACKGROUND OF THE INVENTION

Fiber reinforced composites consisting of reinforcing fibers and a matrix resin are widely used for sporting goods such as golf shafts, fishing rods, tennis rackets and the like. Such composites are also used in the aerospace industry and other general industries since they are light in weight and excellent in mechanical properties.

Fiber reinforced composites are produced by various methods and, at present, it is widely practiced to produce them by using sheet-like intermediate materials called prepregs in which reinforcing fibers are impregnated with a matrix resin. According to these methods, a plurality of prepreg sheets are laminated and heated to form a fiber reinforced composite.

Matrix resins used for prepregs include both thermosetting resins and thermoplastic resins, but in most cases, thermosetting resins are used. Epoxy resins (cured) are mainly used since they have excellent mechanical and chemical properties such as heat resistance, stiffness, dimensional stability and chemicals resistance. The commonly used terms "thermosetting resin" and "epoxy resin" include two cases: 1) a prepolymer and 2) a cured product obtained by reacting a composition containing the prepolymer and other ingredients. In the present specification, the terms "thermosetting resin" and "epoxy resin" are used to mean a "prepolymer" unless otherwise stated.

Problems often encountered in the use of a prepreg obtained by using a thermosetting resin are the tackiness between overlaid prepreg sheets and the drapability of the prepreg. These properties greatly affect prepreg handling convenience.

Overlaid sheets of the prepreg are likely to be delaminated if the tackiness of a prepreg is too small. On the contrary, it is difficult to separate the sheets of the prepreg once overlaid by mistake if the tackiness of a prepreg is too large. The working efficiency in laminating sheets of a prepreg on a mold or mandrel with a curved surface declines remarkably if the drapability of a prepreg is poor.

In recent years, sporting goods such as golf shafts and fishing rods are remarkably reduced in weight, and prepregs suitable for light-weight design are being demanded. Prepregs using high modulus fibers, especially high modulus carbon fibers as reinforcing fibers have been demanded in recent years since they facilitate lighter-weight design. Furthermore, the demand for prepregs with a high reinforcing fiber content is also growing.

However, prepregs decline in drapability if high modulus carbon fibers are used as reinforcing fibers. Furthermore, tackiness tends to be lower if the reinforcing fiber content is higher since the amount of the resin distributed at the surface of the prepreg becomes smaller. Thus, conventional prepregs using a matrix resin have the problem that tackiness and/or drapability becomes insufficient.

Several proposals have been made to improve resin compositions for obtaining good tackiness or drapability, as described later. However, these techniques generally have the problem that tackiness can only be improved at the expense of drapability.

Golf shafts and fishing rods are formed by winding prepregs around a mandrel with a relatively small diameter. If the force to delaminate a prepreg laminate exceeds the tackiness between the laminated sheets of the prepreg, the prepreg wound around a mandrel is delaminated, which disturbs the winding work. The force to delaminate the prepreg is larger if the drapability is smaller. Therefore, even if tackiness is improved at the sacrifice of drapability, the mandrel winding work itself cannot be improved significantly.

Known methods to improve the tackiness of a prepreg include adding a polymer such as a thermoplastic resin or an elastomer to an epoxy resin. Methods of adding a polymer to an epoxy resin include methods of adding a polyvinyl formal resin as stated in JP-A-58-8724 an JP-A-62-169829, methods of adding a polyvinyl acetal resin as stated in JP-A-55-27342, JP-A-55-108443 and JP-A-6-166756, a method of adding a polyester polyurethane as stated in JP-A-5-117423, a method of adding a poly(meth)acrylate polymer as stated in JP-A-54-99161, a method of adding a polyvinyl ether as stated in JP-A4-130156, a method of adding a nitrile rubber as stated in JP-A-2-20546, etc.

OBJECTS OF THE INVENTION

These methods of adding a high polymer to an epoxy resin have the problem that the resin viscosity rises to lower drapability even if the tackiness of the prepreg can be improved. Therefore, it has been difficult to find a resin capable of achieving both satisfactory tackiness and satisfactory drapability in a prepreg with a large reinforcing fiber content using high elastic modulus carbon fibers. It has also been difficult to obtain a prepreg which can be satisfactorily wound around a mandrel.

Accordingly, an object of the present invention is to provide a resin composition for a fiber reinforced composite which can be used to produce a prepreg excellent in tackiness, drapability and windability around a mandrel.

Another object of the present invention is to provide a prepreg excellent in tackiness, drapability and windability around a mandrel, and a fiber reinforced composite obtained by using the prepreg.

Further objects of the invention will become apparent to those of ordinary skill in the art based on the following description and the appended claims.

SUMMARY OF THE INVENTION

The resin composition of the invention for a fiber reinforced composite includes at least components A and B, wherein the component B is soluble in the component A, and component A is a thermosetting resin and component B is a thermoplastic resin with a weight average molecular weight of about 200,000 to about 5,000,000.

The prepreg of the invention is a prepreg in which reinforcing fibers are impregnated with the resin composition to form a fiber reinforced composite. The fiber reinforced composite of the present invention comprises the cured product of the thermosetting resin composition and reinforcing fibers.

DESCRIPTION OF THE PREFERRED EMBODIMENTS

It will be appreciated that the following description is intended to refer to the specific embodiments of the invention selected for illustration in the text, Examples and Comparative Examples and is not intended to define or limit the invention, other than in the appended claims.

The thermosetting resins which can be used as the component A in the resin composition for a fiber reinforced composite of the present invention include epoxy resins, unsaturated polyester resins, vinyl ester resins, phenol resins, melamine resin, urea resin, silicone resins, maleimide resins, cyanate resins, and preliminarily polymerized resins consisting of a maleimide resin and a cyanate resin. Mixtures of these resins can also be used.

Among them, an epoxy resin excellent in heat resistance, elastic modulus and chemicals resistance for a fiber reinforced composite is especially preferred.

As an epoxy resin, a compound with one or more epoxy groups in the molecule, preferably a compound with two or more epoxy groups in the molecule can be used. It is especially preferable to use a mixture consisting of a bifunctional epoxy resin (with two epoxy groups per molecule) and a trifunctional or higher functional epoxy resin (with three or more epoxy groups per molecule) in view of the balance between heat resistance and mechanical properties of the cured product. In such a case, if the amount of the trifunctional or higher functional epoxy resin is too large, it may happen that the crosslinking density of the cured product may become too high to obtain a high toughness. Thus, it is preferable to use about 50 to about 95 parts by weight of a bifunctional epoxy resin and about 5 to about 50 parts by weight of a trifunctional or higher functional epoxy resin per 100 parts by weight of the mixed epoxy resin.

Furthermore, an epoxy resin with a phenol, an amine and/or a compound having a carbon-carbon double bond as a precursor is preferably used to improve the mechanical properties of the cured product and the reactivity with the curing agent.

An epoxy resin with a phenol as a precursor can be obtained by reaction between a phenol and epichlorohydrin. The precursors which can be used here include bisphenols such as bisphenol A and bisphenol F, resorcinol, dihydroxynaphthalene, trihydroxynaphthalene, dihydroxybiphenyl, bishydroxyphenylfluorene, trishydroxyphenylmethane, tetrahydroxyphenylethane, novolak, condensation products of dicyclopentadiene and phenol and the like.

An epoxy resin with an amine as a precursor can be obtained by reaction between an amine and epichlorohydrin. The precursors which can be used here include tetraglycidyl diaminodiphenylmethane, aminophenol, aminocresol, xylenediamine and the like.

An epoxy resin with a compound having a carbon-carbon double bond as a precursor can be obtained by oxidizing the carbon-carbon double bond in the precursor into an epoxy group. The precursors which can be used here include vinylcyclohexene, bis(3-vinylcyclohexylmethyl) adipate, 3-vinylcyclohexylmethyl-3-vinylcyclohexanecarboxylate and the like.

Bisphenol A type epoxy resins (epoxy resins with bisphenol A as a precursor) include the following known resins:

"Epikote" (registered trade name) 825 (epoxy equivalent 172–178), "Epikote" 828 (epoxy equivalent 184–194), "Epikote" 834 (epoxy equivalent 230–270), "Epikote" 1001 (epoxy equivalent 450–500), "Epikote" 1002 (epoxy equivalent 600–700), "Epikote" 1003 (epoxy equivalent 670–770), "Epikote" 1004 (epoxy equivalent 875–975), "Epikote" 1007 (epoxy equivalent 1750–2200), "Epikote" 1009 (epoxy equivalent 2400–3300), "Epikote" 1010 (epoxy equivalent 3000–5000) (respectively produced by Yuka Shell Epoxy K.K.), "Epotohto" (registered trade name) YD-128 (epoxy equivalent 184–194), "Epotohto" YD-011 (epoxy equivalent 450–500), "Epotohto" YD-014 (epoxy equivalent 900–1000), "Epotohto" YD-017 (epoxy equivalent 1750–2100), "Epotohto" YD-019 (epoxy equivalent 2400–3000), "Epotohto" YD-022 (epoxy equivalent 4000–6000) (respectively produced by Tohto Kasei K.K.), "Epicron" (registered trade name) 840 (epoxy equivalent 180–190), "Epicron" 850 (epoxy equivalent 184–194), "Epicron" 1050 (epoxy equivalent 450–500) (respectively produced by Dainippon Ink & Chemicals, Inc.), "Sumi-epoxy" (registered trade name) ELA-128 (epoxy equivalent 184–194, produced by Sumitomo Chemical Co., Ltd.), DER331 (epoxy equivalent 182–192, produced by Dow Chemical).

These resins have a chemical compound represented by the following formula (1):

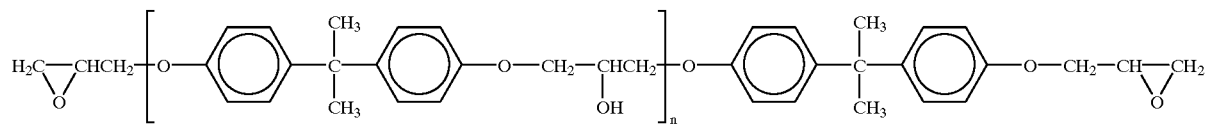

(1)

where n stands for a positive number.

Bisphenol F type epoxy resins include "Epicron" 830 (epoxy equivalent 165–185, produced by Dainippon Ink & Chemicals, Inc.), "Epikote" 806 (epoxy equivalent 160–170), "Epikote" 807 (epoxy equivalent 160–175), "Epikote" E4002P (epoxy equivalent 610), "Epikote" E4003P (epoxy equivalent 800), "Epikote" E4004P (epoxy equivalent 930), "Epikote" E4007P (epoxy equivalent 2060), "Epikote" E4009P (epoxy equivalent 3030), "Epikote" E4010P (epoxy equivalent 4400) (respectively produced by Yuka Shell Epoxy K.K.), etc., and have a chemical structure represented by the following formula (2):

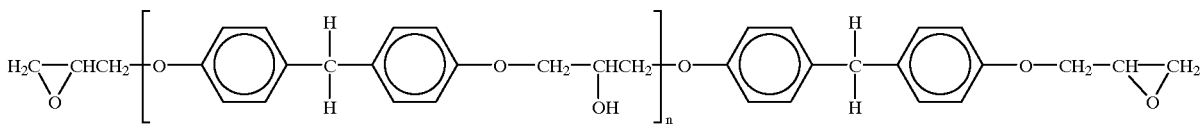

(2)

where n stands for a positive number.

Phenol novolak type epoxy resins include known resins such as "Epikote" 152 (epoxy equivalent 172–179), "Epikote" 154 (epoxy equivalent 176–181) (respectively produced by Yuka Shell Epoxy K.K.), DER438 (epoxy equivalent 176–181, produced by Dow Chemical), "Araldite" (registered trade name) EPN1138 (epoxy equivalent 176–181), "Araldite" 1139 (epoxy equivalent 172–179, produced by Ciba), and have a chemical structure represented by the following formula (3):

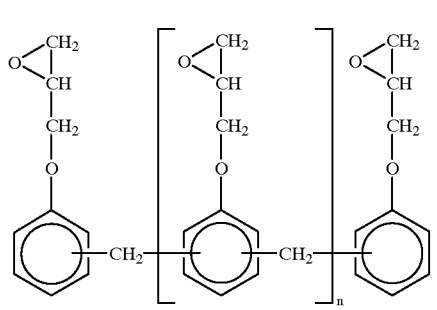

(3)

where n stands for a positive number.

Furthermore, the following epoxy resins can be used: Bisphenol S type epoxy resins marketed as "Epicron" EXA-1514 (epoxy equivalent 290–330, produced by Dainippon Ink & Chemicals, Inc.), and "Denacol" (registered trade name) EX-251 (epoxy equivalent 189, produced by Nagase Kasei Kogyo K.K.), tetrabromobisphenol A type epoxy resins "Epikote" 5050 (epoxy equivalent 380–410, produced by Yuka Shell Epoxy K.K.), "Epicron" 152 (epoxy equivalent 340–380, produced by Dainippon Ink & Chemicals, Inc.), "Sumi-epoxy" ESB-400T (epoxy equivalent 380–420, produced by Sumitomo Chemical Co., Ltd.), and "Epotohto" YBD-360 (epoxy equivalent 350–370, produced by Tohto Kasei K.K.), resorcinol diglycidyl ether marketed as "Denacol" EX-201 (epoxy equivalent 118), hydroquinone diglycidyl ether marketed as "Denacol" EX-203 (epoxy equivalent 112) (respectively produced by Nagase Kasei Kogyo K.K.), 4,4'-diydroxy-3,3'-5,5'-tetramethylbiphenyl diglycidyl ether marketed as "Epikote" YX4000 (epoxy equivalent 180–192, produced by Yuka Shell Epoxy K.K.), diglycidyl ether of 1,6-dihydronaphthalene marketed as "Epicron" HP-4032H (epoxy equivalent 250, produced by Dainippon Ink & Chemicals, Inc.), diglycidyl ether of 9,9-bis(4hydroxyphenyl)fluorene marketed as "Epon" HPT Resin 1079 (epoxy equivalent 250–260, produced by Shell), triglycidyl ether of tris(p-hydroxyphenyl)methane marketed as TACTIX742 (epoxy equivalent 150–157, produced by Dow Chemical), tetraglycidyl ether of tetrakis(p-hydroxyphenyl)ethane marketed as "Epikote" 1031S (epoxy equivalent 196, produced by Yuka Shell Epoxy K.K.), triglycidyl ether of glycerol marketed as "Denacol" EX-314 (epoxy equivalent 145, produced by Nagase Kasei Kogyo K.K.), tetraglycidyl ether of pentaerythritol marketed as "Denacol" EX-411 (epoxy equivalent 231, produced by Nagase Kasei Kogyo K.K.), etc.

Epoxy resins with an amine as a precursor include diglycidyl aniline, tetraglycidyl diaminodiphenylmethane marketed as "Sumi-epoxy" ELM434 (epoxy equivalent 110–130, produced by Sumitomo Chemical Co., Ltd.), tetraglycidyl m-xylylenediamine marketed as TETRAD-X (epoxy equivalent 90–105, produced by Mitsubishi Gas Chemical Co., Inc.), triglycidyl-m-aminophenol marketed as "Sumi-epoxy" ELM120 (epoxy equivalent 118, produced by Sumitomo Chemical Co., Ltd.), and triglycidyl-p-aminophenol marketed as "Araldite" MY0510 (epoxy equivalent 94–107, produced by Ciba).

Polyepoxides obtained by oxidizing a compound having a plurality of double bonds in the molecular include ERL4206 (epoxy equivalent 70–74), ERL-4221 (epoxy equivalent 131–143) and ERL4234 (epoxy equivalent 133–154), respectively, produced by Union Carbide. Furthermore, epoxylated soybean oil and the like can also be used.

In addition to the above, glycidyl esters such as phthalic acid diglycidyl ester, terephthalic acid diglycidyl ester and dimer acid diglycidyl ester, and triglycidyl isocyanurate and the like can also be used.

The thermoplastic resin with a weight average molecular weight of about 200,000 to about 5,000,000 as the component B of the invention is added to the matrix resin to control the viscoelasticity of the matrix and to increase the tackiness and drapability of the prepreg.

The high molecular weight polymer added to the matrix resin to control viscoelasticity can be either a thermoplastic resin or an elastomer. However, if an elastomer is added, the cured product of the matrix resin declines in heat resistance and elastic modulus. Thus, a thermoplastic resin free from the disadvantages of the prior art can be used. Furthermore, to obtain good heat resistance, a thermoplastic resin with a glass transition temperature of about 80° C. or higher or that with a melting point of about 80° C. or higher is preferred.

The tackiness and drapability of a prepreg and the windability around a mandrel depend on prepreg production conditions, reinforcing fibers used and the viscoelasticity of the matrix resin. The viscoelasticity of the matrix resin is large compared to the prepreg production conditions and reinforcing fibers in the degree of freedom of design. Therefore, viscoelasticity is an important factor for controlling the tackiness and drapability and improving windability around a mandrel.

Several parameters measure the viscoelasticity of a matrix resin. The complex viscosity $\eta^*$ and storage modulus G' are especially important parameters for determining the tackiness and drapability of a prepreg. The complex viscosity $\eta^*$ is generally recognized as having a correlationship with drapability. A prepreg using a matrix resin having small complex viscosity $\eta^*$ tends to be excellent in drapability. On the other hand, the storage modulus G' is generally recognized as having correlationship with tackiness. A prepreg using a matrix resin having a large storage modulus G' tends to be excellent in tackiness.

The complex viscosity η* and storage modulus G' of a matrix resin are usually measured according to the dynamic viscoelasticity measuring method using parallel plates. Dynamic viscoelasticity changes depending on the measuring temperature and the measuring frequency. As parameters relatively good in correlationship between the tackiness and drapability of a prepreg near room temperature, the complex viscosity η* and storage modulus G' measured at 50° C. at a frequency of 0.5 Hz are suitable.

If a thermoplastic resin is added to the thermosetting resin used as the matrix resin of a prepreg, the storage modulus G' rises with the increase in the amount of added thermoplastic resin. This improves the tackiness of the prepreg. However, the complex viscosity η* simultaneously rises. Hence, drapability declines and it is difficult to maintain both tackiness and drapability. As for the windability of a prepreg around a mandrel, since the balance between tackiness and drapability is important, it is difficult to achieve a satisfactory windability around a mandrel with the prepreg obtained by this method.

We discovered that if a high molecular thermoplastic resin is dissolved in a thermosetting resin, the storage modulus G' increases remarkably compared to the increase in complex viscosity η*. We also discovered that the increase is even more remarkable when the molecular weight is larger. This finding allows tackiness to be improved remarkably without sacrificing drapability so much by adding a relatively small amount of a high molecular weight thermoplastic resin to a thermosetting resin. This is a new finding not stated or suggested in the conventional literature concerning a matrix resin containing a high molecular weight polymer compound.

If the molecular weight of the thermoplastic resin is small, the storage modulus G' cannot be increased sufficiently compared to the increase in complex viscosity η*. So, it is preferable that the weight average molecular weight of the thermoplastic resin used in the invention is about 200,000 or more, and more preferably about 350,000 or more.

On the other hand, if the molecular weight of the thermoplastic resin is too large, the viscoelasticity more greatly depends on the amount of the thermoplastic resin added. In such a case, it can happen that control becomes difficult and dissolution of the thermoplastic resin into the thermosetting resin composition becomes difficult. So, it is preferable that the weight average molecular weight of the thermoplastic resin is about 5,000,000 or less, and more preferably about 1,700,000 or less.

The mechanism in which the thermoplastic resin as the component B manifests the above-mentioned advantageous effect of improving the viscoelasticity is believed to be that the molecular chains of the thermoplastic resin dissolved in the thermosetting resin used as the component A are entangled. Therefore, the thermoplastic resin used as the component B must be soluble in the thermosetting resin used as the component A. Even if the thermoplastic resin is soluble in the thermosetting resin, if the compatibility of both the resins is low, the molecular chains of the thermoplastic resin are not sufficiently spread apart, thereby preventing the beneficial effect of entanglement to be obtained. In such a case, it is difficult to obtain a sufficient effect for improving the viscoelasticity.

As an index of solubility and compatibility, a solubility parameter SP value calculated from the molecular structure can be used. To obtain sufficient solubility and compatibility, it is preferable that the difference in absolute value between the SP value of the thermoplastic resin and the SP value of the thermosetting resin is in a range of about 0 to about 2.

The difference in absolute value between the SP values can be kept small by selecting the proper mixing ratio of the raw materials of the thermosetting resin, selecting the structure of the thermoplastic resin and the like. When the thermosetting resin used as the component A is a mixture of components, the average value calculated as a sum of the values obtained by multiplying the SP values and weight percentages of the respective raw materials can be used.

The amount of the thermoplastic resin added as component B should be in the range of about 0.1 to about 20 parts by weight per 100 parts by weight of the thermosetting resin added as component A. If the amount of the thermoplastic resin is too small, a sufficient effect cannot be obtained. If the amount is too large, dissolution into the thermosetting resin becomes difficult. However, if a proper combination of the components A and B as described above is present, it is not necessary to add component B in a large amount. Thus, it is preferable that the amount of the thermoplastic resin added as the component B is about 0.1 to about 10 parts by weight per 100 parts by weight of the thermosetting resin used as the component A, and a more preferable range is about 0.1 to about 5 parts by weight.

The thermoplastic resins which can be used as component B include various well known resins. A polymer obtained by polymerizing a vinyl monomer is preferably used since a polymer with a high molecular weight can be easily obtained. The vinyl monomer in this case is a low molecular compound with one polymerizable double bond in the molecule, and the polymer obtained by polymerizing the vinyl monomer means a polymer obtained by polymerizing one or a plurality of vinyl monomers, or a polymer obtained by polymerizing one or a plurality of vinyl monomers and one or a plurality of monomers other than vinyl monomers, or a polymer obtained by chemically modifying the side chains of any of these polymers by saponification, acetalation and the like.

It is preferable that the amount of the vinyl monomer accounts for about 70 mol % or more of all the monomers when a polymer obtained by polymerizing a vinyl monomer and a monomer other than a vinyl monomer is used.

When an epoxy resin composition is used as the thermosetting resin, especially preferable vinyl monomers are (meth)acrylic acid esters and vinylpyrrolidone since they are excellent in compatibility with the epoxy resin and since the cured product of the epoxy resin composition containing any of the vinyl monomers is excellent in physical properties. It is especially preferable that a (meth)acrylic acid ester or vinylpyrrolidone accounts for about 50 mol % or more in the mixture. More preferable is about 80 mol % or more if a mixture consisting of a plurality of vinyl monomers is used. The expression "(meth)acrylic acid ester" is sometimes hereinafter used to mean "methacrylic acid ester or acrylic acid ester". Furthermore, (meth)acrylate is used to mean "methacrylate or acrylate". (Meth)acrylic acid esters which can be used here include alkyl (meth)acrylates such as methyl (meth)acrylate, ethyl (meth)acrylate, butyl (meth)acrylate, 2-ethylhexyl (meth)acrylate, octyl (meth)acrylate, propyl (meth)acrylate, amyl (meth)acrylate, lauryl (meth)acrylate and cyclohexyl (meth)acrylate, hydroxyalkyl (meth)acrylates such as hydroxyethyl (meth)acrylate and hydroxypropyl (meth)acrylate, glycidyl (meth)acrylate, benzyl acrylate and the like.

Among them, methyl (meth)acrylate is especially preferred. It is preferred that methyl (meth)acrylate accounts for about 50 mol % or more in (meth)acrylic acid esters, and more preferably about 80 mol % or more.

Vinyl monomers other than (meth)acrylic acid esters which can be used here include (meth)acrylic acid, itaconic acid, maleic acid, maleic anhydride, maleimide, styrene, methylstyrene, (meth)acyrlonitrile, (meth)acrylamide, acryloylmorpholine, vinylpyrrolidone, vinyl methyl ether, vinyl acetate, methyl vinyl ketone, vinyl chloride, vinylidene chloride, ethylene, propylene, 4-methylpentene and the like.

Comonomers other than vinyl monomers, which can be used herein include dienes such as butadiene and isoprene, acetylene, its substituent derivatives and the like.

Thermoplastic resins other than the polymers obtained by vinyl monomers, which can be used herein include such polymers as polyethers, polyesters, polyamides, polyimides, polyurethane and polyurea. It is preferable to use a polyether, especially a polyoxyalkylene, if an epoxy resin is used as the thermosetting resin, to improve compatibility with the epoxy resin and easiness to obtain a polymer with high molecular weight. Among polyoxyalkylenes, polyoxyethylene is preferred.

The thermoplastic resins which can be used as the component B include many known products. For example, polymethyl methacrylate and polymers produced with methyl methacrylate as a main raw material are marketed as MP-1450 (weight average molecular weight 250,000–500,000, Tg 128° C.), MP-1451 (weight average molecular weight 500,000–1,500,000, Tg 128° C.), MP-2200 (weight average molecular weight 1,000,000–1,500,000, Tg 128° C.; produced by Soken Kagaku K.K.), "Dianal" (registered trade name) BR-85 (weight average molecular weight 280,000, Tg 105° C.), "Dianal" BR-88 (weight average molecular weight 480,000, Tg 105° C.), "Dianal" BR-108 (weight average molecular weight 550,000, Tg 90° C.) (respectively produced by Mitsubishi Rayon Co., Ltd.), "Matsumoto Microsphere" M, M100, M500 (weight average molecular weight 1,000,000–1,500,000, Tg 105° C.; produced by Matsumoto Yushi Seiyaku K.K.) and the like.

Other examples include polyvinylpyrrolidone, which is marketed as "Luviskol" (registered trade name) K80 (weight average molecular weight 900,000, Tg 150–185° C.), "Luviskol" K90 (weight average molecular weight 1,200,000, Tg 150–185° C.) (respectively produced by BASF Japan K.K.) and the like.

Furthermore, polyoxyethylene, which is marketed as PEO-3 (weight average molecular weight 600,000–1,100,000, melting point 150° C. or higher), PEO-8 (weight average molecular weight 1,700,000–2,200,000, melting point 150° C. or higher) (respectively produced by Sumitomo Seika K.K.) and the like may be used.

A thermosetting resin is, in most cases, used in combination with a curing agent. The curing agent used is a compound with functional groups capable of reacting with the thermosetting resin or a compound acting as a catalyst in the polymerization reaction of the thermosetting resin.

The curing agents which can be used for epoxy resins include aromatic amines such as diaminodiphenylmethane and diaminodiphenylsulfone, aliphatic amines, imidazole derivatives, dicyandiamide, tetramethylguanidine, thiourea-modified amines, carboxylic anhydrides such as methylhexahydrophthalic anhydride, carboxylic acid hydrazides, carboxylic acid amides, polyphenol compounds, novolak resins, polymercaptans and Lewis acid complexes such as boron fluoride ethylamine complex.

An addition product with curing activity obtained by letting any of these curing agents and an epoxy resin react with each other can also be used as a curing agent. Microcapsulated curing agents can also be used since they improve the storage stability of the prepreg.

Any of these curing agents can be used in combination with a proper curing accelerator for improving curing activity. In the case of an epoxy resin, combinations consisting of 1) dicyandiamide as a curing agent and a urea derivative or imidazole derivative as a curing accelerator and 2) a carboxylic anhydride or polyphenol compound as a curing agent and a tertiary amine or imidazole derivative as a curing accelerator are preferred.

Urea derivatives which can be used here include compounds obtained by reaction between a secondary amine and an isocyanate, for example, compounds with a chemical structure represented by the following formula (4):

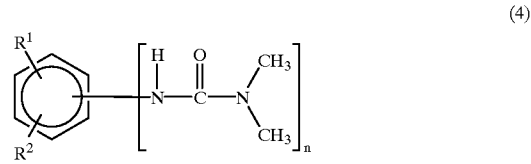

(4)

where $R^1$ and $^2$ stand for, respectively independently, H, Cl, $CH_3$, $OCH_3$ or $NO_2$ and n=1 or 2.

3-phenyl-1,1-dimethylurea, 3-(3,4-dichlorophenyl)-1,1-dimethylurea (DCMU) and the like are preferred. DCMU is represented by the following structural formula (5):

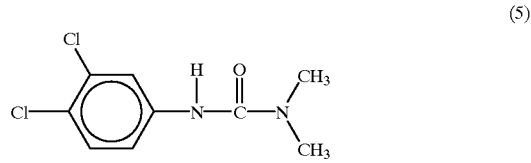

(5)

Among these combinations of a curing agent and a curing accelerator for epoxy resins, a combination consisting of dicyandiamide and a urea derivative represented by the above formula (4) are especially preferred, since it causes hardening at a relatively low temperature and is good in storage stability.

The thermosetting resin composition as the resin composition for a fiber reinforced composite of the present invention can contain a polymer not belonging to the component B for purposes of improving the adhesion between the matrix resin and the reinforcing fibers, improving the toughness of the matrix resin and improving the impact resistance of the fiber reinforced composite.

The adhesiveness between the matrix resin and the reinforcing fibers can be further improved if a thermoplastic resin with highly polar groups, especially hydrogen-bondable functional groups is used as the polymer. The hydrogen-bondable functional groups include alcoholic hydroxyl groups, amide groups, imide groups, sulfonyl groups and the like.

Polymers with alcoholic hydroxyl groups include polyvinyl acetal resins such as polyvinyl formal and polyvinyl butyral and phenoxy resins. Polymers with amide groups include polyamides. Polymers with imide groups include polyimides. Polymers with sulfonyl groups include polysulfones. The polyamides, polyimides and polysulfones may have ether bonds or functional groups such as carbonyl groups at their main chain. The polyamides may have substituent groups at the nitrogen atoms of the amide groups.

Among them, polyamides, polyimides and polysulfones are also useful for improving the toughness of the matrix resin.

Polymers with hydrogen-bondable functional groups soluble in epoxy resins include the following known products. Polyvinyl acetal resins include "Denka Butyral" and "Denka Formal" (produced by Denki Kagaku Kogyo K.K.), and "Vinylec" (produced by Chisso K.K.). Phenoxy resins include "UCAR" PKHR (produced by Union Carbide). Polyamide resins include "Macromelt" (produced Henkel Hakusui K.K.) and "Amilan" CM4000 (produced by Toray Industries, Inc.). Polyimides include "Ultem" (produced by General Electric) and "Matrimid" 5218 (produced by Ciba). Polysulfones include "Victrex" (produced by Mitsui Toatsu Chemicals, Inc.) and "UDEL" (produced by Union Carbide). These resins have the following chemical structures:

(6)

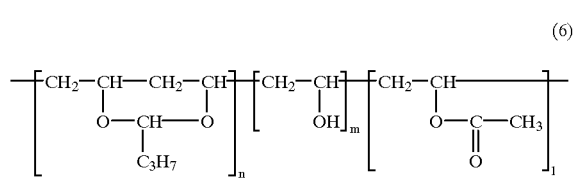

wherein n=219–240, m=60–72 and l=0–9;

(7)

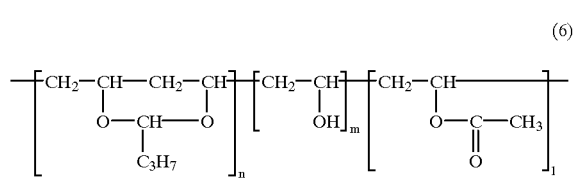

wherein n=365, m=22–30 and l=42–59;

(8)

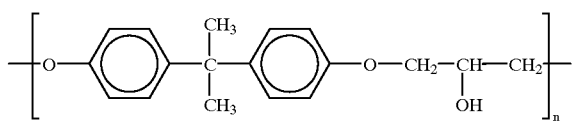

wherein n=35–57;

(9)

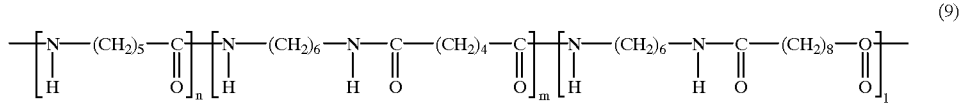

wherein n=37–40, m=32–35 and l=23–26;

(10)

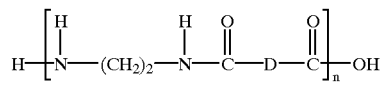

where D stands for a hydrocarbon group with 32 carbon atoms in the molecule of dimer acid, n=5–60;

(11)

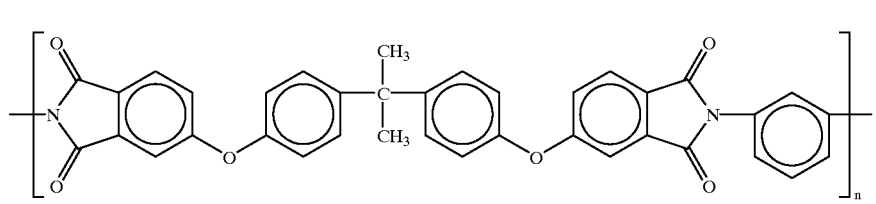

wherein n=about 20; and (12)

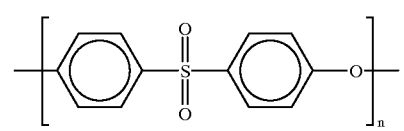

wherein n=50–80.

As the polyvinyl acetal resin, a resin with polyvinyl formal having about 60 wt % or more of vinyl formal component is preferable in view of the mechanical properties of the composite.

As the polymer, a compound with a bending elastic modulus of about 10 MPa or more at 25° C. is preferable since the hardened product of the epoxy resin composition is unlikely to decline in elastic modulus. Furthermore, the thermoplastic resin of the invention can contain such additives as a reactive diluent, antioxidant and organic or inorganic particles.

As the reactive diluent, a monofunctional epoxy compound can be preferably used. It can be selected from butyl glycidyl ether, 2-ethylhexyl glycidyl ether, phenyl glycidyl ether, cresyl glycidyl ether, p-sec-butyl glycidyl ether, p-tert-butyl glycidyl ether and the like.

The antioxidants which can be preferably used here include phenol based antioxidants such as 2,6-di-tert-butyl-p-cresol (BHT), butylated hydroxyanisol and tocophenol, and sulfur based antioxidants such as dilauryl 3,3'-thiodipropionate, and distearyl 3,3'-thiodipropionate.

The organic particles which can be used here include fine particles of thermoplastic resins, hardened thermosetting resins, elastomers and the like. These particles are effective for improving the toughness of the resin and improving the impact resistance of the fiber reinforced composite.

The thermoplastic resins which can preferably be used as organic particles include polyamides. The thermosetting resins which can be preferably used include epoxy resins, phenol resins and the like. Known polyamide particles include SP-500 produced by Toray Industries, Inc. and "Orgasole" produced by Atochem.

Elastomer particles which can be preferably used include crosslinked rubber particles, and core-shell type rubber particles obtained by graft-polymerizing a different polymer on the surfaces of crosslinked rubber particles.

Known crosslinked rubber particles include XER-91 (produced by Japan Synthetic Rubber Co., Ltd.) which is a crosslinked carboxyl modified butadiene-acrylonitrile copolymer, CX-MN series (Nihon Shokubai K.K.) and YR-500 series (produced by Tohto Kasei K.K.) respectively of fine acrylic rubber particles and the like.

Known core-shell type rubber particles include "Kureha Paraloid" EXL-2655 (produced by Kureha Chemical Industry Co., Ltd.) which is a butadiene alkyl methacrylate styrene copolymer, "Stafiloid" AC-3355 and TR-2122 (produced by Takeda Chemical Industries, Ltd.) which are acrylate methacrylate copolymers, "PARALOID" EXL-2611 and EXL-3387 (produced by Rohm & Haas) which are butyl acrylate methyl methacrylate copolymers and the like.

Inorganic particles which can be used here include silica, alumina, smectites and synthetic mica. These inorganic particles are added mainly for rheology control, thickening and thixotropy control.

It is preferable that the complex viscosity $\eta^*$ of the matrix resin is about 200 to about 2,000 Pa·s to let the prepreg manifest moderate drapability. The drapability of the prepreg becomes insufficient and impregnation into the reinforcing fibers is unlikely to be achieved if the complex viscosity $\eta^*$ is larger than this range. The form retention of the prepreg may also decline if the complex viscosity $\eta^*$ is smaller than this range.

On the other hand, the storage modulus G' of the matrix resin is generally recognized as having a correlationship with tackiness. A prepreg using a matrix resin large in storage modulus G' tends to be excellent in tackiness. It is preferable that the storage modulus G' is about 100 to about 2,000 Pa to manifest moderate tackiness. If the storage modulus G' is larger than this range, tackiness is too large, and when prepreg sheets are overlaid by mistake, it is difficult to separate them, making it difficult to correct the mistake. Tackiness is too low and the overlaid prepreg sheets are prone to delamination in the step of prepreg lamination, inconveniencing the lamination work if the storage modulus G' is smaller than this range.

The balance between tackiness and drapability is important for windability of a prepreg around a mandrel. So, the ratio of storage modulus G' to complex viscosity $\eta^*$, i.e., G'/$\eta^*$ is used as an index for obtaining good windability. It is preferable that the ratio G'/$\eta^*$ satisfies the relation of $0.9 \leq G'/\eta^* \leq 2.0$, since both tackiness and drapability are good under these conditions.

A prepreg can be produced as an intermediate material for a fiber reinforced composite if reinforcing fibers are impregnated with the resin composition for a fiber reinforced composite of the invention. The reinforcing fibers which can be used for producing the prepreg include carbon fibers, glass fibers, aramid fibers, boron fibers, alumina fibers, silicon carbide fibers and the like. Two or more kinds of these fibers can also be used together. The form and arrangement of the reinforcing fibers are not limited. For example, fiber structures such as long fibers substantially collimated in one direction, single tow, woven fabric, knitted fabric, nonwoven fabric, mat and braid can be used.

To produce light-weight sporting goods such as golf shafts and fishing rods, it is preferable to use reinforcing fibers with a high elastic modulus for producing the prepreg to let the product manifest a sufficient rigidity by small amounts of materials. It is preferable that the elastic modulus of the reinforcing fibers is about 200 to about 800 GPa.

Especially when carbon fibers are used as reinforcing fibers, the strength and elastic modulus of the obtained fiber reinforced composite greatly depend on the carbon fiber content. Therefore, when a certain amount of reinforcing fibers are contained, the weight of the product can be reduced with the performance of the composite and final product kept almost constant by decreasing the amount of the matrix resin to be impregnated. For this purpose, a prepreg high in reinforcing fiber content can be suitably used. In such a case, it is preferable that the reinforcing fiber content of the prepreg is about 60 to about 90 wt %, more preferably about 67 to about 80 wt %, based on the wt % of the matrix resin. Handling convenience such as tackiness, drapability and windability around a mandrel and physical properties after curing are excellent if the resin composition of the invention is used for producing a prepreg with a high reinforcing fiber content. Such results are not achieved by conventional techniques.

The tackiness T of the prepreg can be quantitatively evaluated by bonding 50 mm×50 mm prepreg samples by pressure contact at a load of 0.11 MPa and measuring the peel strength (MPa). Drapability D can be quantitatively evaluated as the inverse number (GPa$^{-1}$) of 0° bending elastic modulus of a prepreg measured by the three-point bending test.

The peel strength T of a prepreg can be measured by bonding 50 mm×50 mm prepreg samples by pressure contact at 0.11 MPa and peeling, and dividing the maximum load at that time by the area of the prepreg.

The bending elastic modulus of a prepreg can be obtained by bending a 85 mm (fiber direction)×15 mm prepreg sample at three points with the distance between support points kept at 40 mm using an indentor with a 4 mm diameter, to obtain a load-displacement curve, and using the gradient of the initial straight portion. The above measurement is effected in an environment of 23±2° C. and 50±5% RH.

In the present invention, it is preferable that the tackiness index T of a prepreg is about 0.05 to about 0.20 MPa. It is preferable that the drapability index D of a prepreg is about 0.01 to about 0.1 GPa$^{-1}$. The balance between the tackiness and drapability of a prepreg is important for windability of the prepreg around a mandrel. It is, therefore, preferable that T and D satisfy the relation of $2.3 \times 10^{-3} \leq D \cdot T \leq 1.2 \times 10^{-2}$ and the prepreg have a windability index of about 0 to about 100.

A prepreg can be produced, for example, by dissolving the resin composition for a fiber reinforced composite into an organic solvent such as methyl ethyl ketone or methanol, to lower the viscosity, and impregnating reinforcing fibers with it (so-called wet method), or by heating the resin composition for a fiber reinforced composite, to lower the viscosity and impregnating reinforcing fibers with it (so-called hot melt method or dry method).

In the wet method, reinforcing fibers are immersed in a resin composition solution, removed from the solution and heat treated in an oven or by similar means to evaporate the solvent, to thereby obtain a prepreg. In the hot melt method, releasing paper or the like is coated with a resin composition to prepare a resin film. The film is overlaid on reinforcing fibers from one side or both sides. Then, the laminate is heated and pressurized to achieve impregnation by the resin, to thereby produce a prepreg. As another version of the hot melt method, while a reinforcing fiber bundle is unwound, it is directly impregnated with a resin composition to produce a prepreg without using the film prepared by coating with the resin composition.

The prepreg prepared by the wet method is likely to leave some small amount of residual solvent which can cause voids to be formed in the composite. So, in the invention, it is preferable to produce the prepreg according to the hot melt method.

The prepreg obtained as described above is cut to obtain patterns which are then laminated, and the laminate is pressurized while the resin is heated to be cured, to thereby obtain a fiber reinforced composite. Heating and pressurization can be effected by the press molding method, autoclave molding method, bag molding method, sheet winding method, internal pressure molding method and the like. The sheet winding method or internal pressure molding method is preferred for sporting goods.

In the sheet winding method, a prepreg is wound around a mandrel to form a cylinder and the method is suitable for producing rods such as golf shafts and fishing rods. In more detail, a prepreg is wound around a mandrel and fixed so as not to peel from the mandrel. Alternatively, a thermoplastic resin tape (wrapping tape) is wound around the prepreg wound around a mandrel to apply a forming pressure to the prepreg. Then, the resin is heated and hardened in an oven. Then, the mandrel is removed to obtain a cylinder.

A preform with a prepreg wound around an internal pressurizer made of a thermoplastic resin is set in a mold in the internal pressure molding method, and high pressure air is introduced into the internal pressurizer for pressurization while the mold is heated, to mold a fiber reinforced composite. The internal pressure molding method can be suitably used for forming a specially formed golf shaft or bat, especially complicated forms like rackets for tennis or badminton and other structures.

If the resin composition for a fiber reinforced composite of the invention is used, a prepreg excellent in tackiness and drapability and good in windability around a mandrel can be obtained even if high elastic modulus carbon fibers are used as the reinforcing fibers, or even if the reinforcing fiber content is large.

As described above, according to the present invention, since a matrix resin containing a thermoplastic resin with the molecular weight kept in a specific range and soluble in a thermosetting resin is used to produce a prepreg, the prepreg obtained can be very good in both tackiness and drapability and also good in windability around a mandrel, and can be used to produce a fiber reinforced composite at high working efficiency.

EXAMPLES

The invention is described below more concretely in reference to examples. The solubility parameter, dynamic viscoelasticity, the tackiness and drapability of a prepreg and the windability of a prepreg around a mandrel were evaluated under the following conditions.

A. Solubility Parameter

Solubility parameter SP value was obtained based on the Fedors' method stated in Polym. Eng. Sci., 14 (2), 147–154 (1974).

B. Dynamic Viscoelasticity

The dynamic viscoelasticity was measured using a Dynamic Analyzer Model RDAII produced by Rheometrics. For measurement, parallel plates of 25 mm in radius were used, to measure the complex viscosity $\eta^*$ and the storage modulus G' at a measuring frequency of 0.5 Hz at a heating rate of 1.5° C./min in time/curing sweep.

C. Tackiness of Prepreg

Prepreg sheets were bonded by pressure contact and peeled, and the maximum load in this case was divided by the area of the sample, to obtain peel strength T (MPa). "Instron" (registered trade name) Model 4201 Universal Testing Machine (produced by Instron Japan K.K.) was used as the measuring instrument for measurement under the following conditions.

Environment: 23±2° C., 50±5% RH

Sample: 50×50 mm

Loading speed: 1 mm/min

Bonding load: 0.11 MPa

Loading time: 5±2 sec.

Peeling speed: 10 mm/min

D. Drapability of Prepreg

Drapability was evaluated by measuring the bending elastic modulus of a prepreg. The bending elastic modulus was measured according to JIS K 7074 "Bending Test Methods for Fiber Reinforced Plastics". "Instron" Model 4201 Universal Testing Machine was used as the measuring instrument for measurement under the following conditions.

Environment: 23±2° C., 50±5% RH

Sample: 85 mm (fiber direction)×15 mm

Loading speed: 5 mm/min

Distance between support points: 40 mm

Diameter of indentor: 4 mm

The inverse number D ($GPa^{-1}$) of the 0° bending elastic modulus obtained was used as an index of drapability.

E. Windability of Prepreg Around Mandrel

The windability of a prepreg around a mandrel was evaluated as follows.

A prepreg which had been allowed to stand in an atmosphere of 23°C. and 50% RH for 3 days was wound around a SUS cylinder with a diameter of 10 mm and a length of 1000 mm with an angle of 45° kept between the reinforcing fiber collimation direction and the longitudinal direction of the cylinder, and it was allowed to stand for 15 minutes, to observe the winding state of the prepreg. The winding end portions of the prepreg were classified as follows, in reference to the maximum peel height, and the peel lengths were added within the respective classes of S, M and L. Furthermore, a mandrel windability index was calculated from the following formula, as an index of windability.

S: Portions of less than 2 mm in maximum peel height

M: Portions of 2 mm to less than 4 mm in maximum peel height

L: Portions of 4 mm or more in maximum peel height

Mandrel windability index=S+2M+4L

Example 1

(1) Production of Matrix Resin Composition

The following raw materials were kneaded using a kneader, to produce a matrix resin composition.

| | |
|---|---|
| Bisphenol A type epoxy resin ("Epikote" 828 produced by Yuka Shell Epoxy K. K.) | 44 parts by weight |

| | |
|---|---|
| Bisphenol A type epoxy resin ("Epikote" 1001 produced by Yuka Shell Epoxy K. K.) | 7 parts by weight |
| Bisphenol A type epoxy resin ("Epikote" 1009 produced by Yuka Shell Epoxy K. K.) | 14 parts by weight |
| Phenol novolak type epoxy resin ("Epikote" 154 produced by Yuka Shell Epoxy K. K.) | 35 parts by weight |
| Polymer A (polymethyl methacrylate; weight average molecular weight 500,000; glass transition temperature 105° C.) | 2 parts by weight |
| Dicyandiamide | 4 parts by weight |
| DCMU | 4 parts by weight |

(2) Production of Prepreg

The resin composition was applied onto releasing paper using a reverse roll coater, to produce a resin film. Then, the resin film was overlaid on both sides of carbon fibers "Torayca" (registered trade name) T300B-12K (produced by Toray Industries, Inc.) with a tensile elastic modulus of 230 GPa arranged in one direction, and the laminate was heated and pressurized (130° C. and 0.4 MPa), to impregnate the fibers with the resin. Thus, a unidirectional prepreg with a carbon fiber unit weight of 150 g/m² and a matrix resin content of 35 wt % could be produced.

The tackiness, drapability and windability around a mandrel, of the prepreg were good. The results are shown in Table 1.

Example 2

(1) Production of Matrix Resin Composition

The following raw materials were kneaded using a kneader, to produce a matrix resin composition.

| | |
|---|---|
| Bisphenol A type epoxy resin ("Epikote" 828 produced by Yuka Shell Epoxy K. K.) | 45 parts by weight |
| Bisphenol A type epoxy resin ("Epikote" 1001 produced by Yuka Shell Epoxy K. K.) | 7 parts by weight |
| Bisphenol A type epoxy resin ("Epikote" 1009 produced by Yuka Shell Epoxy K. K.) | 13 parts by weight |
| Phenol novolak type epoxy resin ("Epikote" 154 produced by Yuka Shell Epoxy K. K.) | 35 parts by weight |
| Polymer B (polymethyl methacrylate; weight average molecular weight 1,500,000; glass transition temperature 105° C.) | 2 parts by weight |
| Dicyandiamide | 4 parts by weight |
| DCMU | 4 parts by weight |

(2) Production of Prepreg

A prepreg was produced as described in Example 1. The tackiness, drapability and windability around a mandrel of the prepreg were good. The results are shown in Table 1.

Example 3

(1) Production of Matrix Resin Composition

The following raw materials were kneaded using a kneader, to produce a matrix resin composition.

| | |
|---|---|
| Bisphenol A type epoxy resin ("Epikote" 828 produced by Yuka Shell Epoxy K. K.) | 45 parts by weight |
| Bisphenol A type epoxy resin ("Epikote" 1001 produced by Yuka Shell Epoxy K. K.) | 7 parts by weight |
| Bisphenol A type epoxy resin ("Epikote" 1009 produced by Yuka Shell Epoxy K. K.) | 13 parts by weight |
| Phenol novolak type epoxy resin ("Epikote" 154 produced by Yuka Shell Epoxy K. K.) | 35 parts by weight |
| Polymer C (poly(methyl methacrylate/propyl acrylate); methyl methacrylate/ propyl acrylate = 80/20 (mol/mol); weight average 360,000; glass transition temperature 20° C. | 5 parts by weight |
| Dicyandiamide | 4 parts by weight |
| DCMU | 4 parts by weight |

(2) Production of Prepreg

A prepreg was produced as described in Example 1. The tackiness, drapability and windability around a mandrel of the prepreg were good. The results are shown in Table 1.

Example 4

(1) Production of Matrix Resin Composition

The following raw materials were kneaded using a kneader, to produce a matrix resin composition.

| | |
|---|---|
| Bisphenol A type epoxy resin ("Epikote" 828 produced by Yuka Shell Epoxy K. K.) | 45 parts by weight |
| Bisphenol A type epoxy resin ("Epikote" 1001 produced by Yuka Shell Epoxy K. K.) | 7 parts by weight |
| Bisphenol A type epoxy resin ("Epikote" 1009 produced by Yuka Shell Epoxy K. K.) | 13 parts by weight |
| Phenol novolak type epoxy resin ("Epikote" 154 produced by Yuka Shell Epoxy K. K.) | 35 parts by weight |
| Polymer E (polyvinylpyrrolidone; weight average molecular weight 1,200,000; glass transition temperature 150–185° C. | 2 parts by weight |
| Dicyandiamide | 4 parts by weight |
| DCMU | 4 parts by weight |

(2) Production of Prepreg

A prepreg was produced as described in Example 1. The tackiness, drapability and windability around a mandrel of the prepreg were good. The results are shown in Table 1.

Example 5

(1) Production of Matrix Resin Composition

The following raw materials were kneaded using a kneader, to produce a matrix) resin composition.

| | |
|---|---|
| Bisphenol A type epoxy resin ("Epikote" 828 produced by Yuka Shell Epoxy K. K.) | 45 parts by weight |
| Bisphenol A type epoxy resin ("Epikote" 1001 produced by Yuka Shell Epoxy K. K.) | 7 parts by weight |

-continued

| | |
|---|---|
| Bisphenol A type epoxy resin ("Epikote" 1009 produced by Yuka Shell Epoxy K. K.) | 13 parts by weight |
| Phenol novolak type epoxy resin ("Epikote" 154 produced by Yuka Shell Epoxy K. K.) | 35 parts by weight |
| Polymer F (polyoxyethylene; weight average molecular weight 1,700,000 to 2,200,000; melting point 150° C. or higher) | 2 parts by weight |
| Dicyandiamide | 4 parts by weight |
| DCMU | 4 parts by weight |

(2) Production of Prepreg

A prepreg was produced as described in Example 1. The tackiness, drapability and windability around a mandrel of the prepreg were good. The results are shown in Table 1.

Comparative Example 1

(1) Production of Matrix Resin Composition

The following raw materials were kneaded using a kneader, to produce a matrix resin composition.

| | |
|---|---|
| Bisphenol A type epoxy resin ("Epikote" 828 produced by Yuka Shell Epoxy K. K.) | 44 parts by weight |
| Bisphenol A type epoxy resin ("Epikote" 1001 produced by Yuka Shell Epoxy K. K.) | 7 parts by weight |
| Bisphenol A type epoxy resin ("Epikote" 1009 produced by Yuka Shell Epoxy K. K.) | 14 parts by weight |
| Phenol novolak type epoxy resin ("Epikote" 154 produced by Yuka Shell Epoxy K. K.) | 35 parts by weight |
| Dicyandiamide | 4 parts by weight |
| DCMU | 4 parts by weight |

(2) Production of Prepreg

A prepreg was produced as described in Example 1. The handling convenience was poor since the tackiness of the prepreg was weak. Furthermore, the windability around a mandrel was poor since the tackiness was weak. The results are shown in Table 2.

Comparative Example 2

(1) Production of Matrix Resin Composition

The following raw materials were kneaded using a kneader, to produce a matrix resin composition.

| | |
|---|---|
| Bisphenol A type epoxy resin ("Epikote" 828 produced by Yuka Shell Epoxy K. K.) | 45 parts by weight |
| Bisphenol A type epoxy resin ("Epikote" 1001 produced by Yuka Shell Epoxy K. K.) | 7 parts by weight |
| Bisphenol A type epoxy resin ("Epikote" 1009 produced by Yuka Shell Epoxy K. K.) | 13 parts by weight |
| Phenol novolak type epoxy resin ("Epikote" 154 produced by Yuka Shell Epoxy K. K.) | 35 parts by weight |

-continued

| | |
|---|---|
| Polymer D (polymethyl methacrylate; weight average molecular weight 100,000; glass transition temperature 105° C. | 10 parts by weight |
| Dicyandiamide | 4 parts by weight |
| DCMU | 4 parts by weight |

(2) Production of Prepreg

A prepreg was produced as described in Example 1. The handling convenience was poor since the tackiness of the prepreg was weak. Furthermore, the windability around a mandrel was poor since the tackiness was weak. The results are shown in Table 2.

Comparative Example 3

(1) Production of Matrix Resin Composition

The following raw materials were kneaded using a kneader, to produce a matrix resin composition.

| | |
|---|---|
| Bisphenol A type epoxy resin ("Epikote" 828 produced by Yuka Shell Epoxy K. K.) | 35 parts by weight |
| Bisphenol A type epoxy resin ("Epikote" 1001 produced by Yuka Shell Epoxy K. K.) | 30 parts by weight |
| Phenol novolak type epoxy resin ("Epikote" 154 produced by Yuka Shell Epoxy K. K.) | 35 parts by weight |
| Polyvinyl formal resin ("Vinylec" K produced by Chisso K. K.) | 7 parts by weight |
| Dicyandiamide | 4 parts by weight |
| DCMU | 4 parts by weight |

(2) Production of Prepreg

A prepreg was produced as described in Example 1. The tackiness of the prepreg was good. However, the windability around a mandrel was poor since the prepreg was hard and poor in drapability. The results are shown in Table 2.

Comparative Example 4

(1) Production of Matrix Resin Composition

The following raw materials were kneaded using a kneader, to produce a matrix resin composition.

| | |
|---|---|
| Bisphenol A type epoxy resin ("Epikote" 828 produced by Yuka Shell Epoxy K. K.) | 35 parts by weight |
| Bisphenol A type epoxy resin ("Epikote" 1001 produced by Yuka Shell Epoxy K. K.) | 30 parts by weight |
| Phenol novolak type epoxy resin ("Epikote" 154 produced by Yuka Shell Epoxy K. K.) | 35 parts by weight |
| Polyvinyl formal resin ("Vinylec" K produced by Chisso K. K.) | 10 parts by weight |
| Dicyandiamide | 4 parts by weight |
| DCMU | 4 parts by weight |

(2) Production of Prepreg

A prepreg was produced as described in Example 1. The tackiness of the prepreg was good. However, the windability around a mandrel was poor since the prepreg was hard and poor in drapability. The results are shown in Table 2.

TABLE 1

|  |  | Example 1 | Example 2 | Example 3 | Example 4 | Example 5 |
|---|---|---|---|---|---|---|
| Resin composition | Component [A] epoxy resin (parts by weight) | | | | | |
|  | "Epikote" 828 (Sp value 10.6 cal$^{1/2}$/cm$^{3/2}$) | 44 | 45 | 45 | 45 | 45 |
|  | "Epikote" 828 (Sp value 10.6 cal$^{1/2}$/cm$^{3/2}$) | 7 | 7 | 7 | 7 | 7 |
|  | "Epikote" 1009 (Sp value 13.8 cal$^{1/2}$/cm$^{3/2}$) | 14 | 13 | 13 | 13 | 13 |
|  | "Epikote" 154 (Sp value 10.8 cal$^{1/2}$/cm$^{3/2}$) | 35 | 35 | 35 | 35 | 35 |
|  | Component [B] (parts by weight) | | | | | |
|  | Polymer A (molecular weight 500,000, Sp value 10.0 $^{1/2}$/cm$^{3/2}$) | 2 | — | — | — | — |
|  | Polymer B (molecular weight 1,500,000, Sp value 10.0 $^{1/2}$/cm$^{3/2}$) | — | 2 | — | — | — |
|  | Polymer C (molecular weight 360,000, Sp value 10.5 $^{1/2}$/cm$^{3/2}$) | — | — | 5 | — | — |
|  | Polymer D (molecular weight 100,000, Sp value 10.0 $^{1/2}$/cm$^{3/2}$) | — | — | — | — | — |
|  | Polymer E (molecular weight 1,200,000, Sp value 13.3 $^{1/2}$/cm$^{3/2}$) | — | — | — | 2 | — |
|  | Polymer F (molecular weight 1,700,000–2,200,000, Sp value 9.4 $^{1/2}$/cm$^{3/2}$) | — | — | — | — | 2 |
|  | Polyvinyl formal resin ("Vinylec" K) | — | — | — | — | — |
|  | Component [C] hardening agent and hardening accelerator (parts by weight) | | | | | |
|  | Dicyandiamide | 4 | 4 | 4 | 4 | 4 |
|  | DCMU | 4 | 4 | 4 | 4 | 4 |
| Dynamic viscoelasticity of resin | 25° C. Complex viscosity η$^s$ (Pa · s) | 33700 | 57600 | 49700 | 52300 | 34500 |
|  | Storage modulus G' (Pa) | 34700 | 60800 | 55600 | 58400 | 32700 |
|  | 50° C. Complex viscosity η$^s$ (Pa · s) | 303 | 610 | 516 | 580 | 342 |
|  | Storage modulus G' (Pa) | 341 | 809 | 809 | 684 | 338 |
|  | G' / η‡ | 1.1 | 1.3 | 1.6 | 1.2 | 1.0 |
| Properties of prepreg | Tackiness T (MPa) | 0.11 | 0.14 | 0.13 | 0.11 | 0.12 |
|  | Drapability D (GPa$^{-1}$) | 0.083 | 0.053 | 0.059 | 0.051 | 0.089 |
|  | Mandrel windability index | 22 | 51 | 77 | 63 | 19 |

TABLE 2

|  |  | Comparative Example 1 | Comparative Example 2 | Comparative Example 3 | Comparative Example 4 |
|---|---|---|---|---|---|
| Resin composition | Component [A] epoxy resin (parts by weight) | | | | |
|  | "Epikote" 828 (Sp value 10.6 cal$^{1/2}$/cm$^{3/2}$) | 44 | 45 | 35 | 35 |
|  | "Epikote" 828 (Sp value 10.6 cal$^{1/2}$/cm$^{3/2}$) | 7 | 7 | 30 | 30 |
|  | "Epikote" 1009 (Sp value 13.8 cal$^{1/2}$/cm$^{3/2}$) | 14 | 13 | — | — |
|  | "Epikote" 154 (Sp value 10.8 cal$^{1/2}$/cm$^{3/2}$) | 35 | 35 | 35 | 35 |
|  | Component [B] (parts by weight) | | | | |
|  | Polymer A (molecular weight 500,000, Sp value 10.0 $^{1/2}$/cm$^{3/2}$) | — | — | — | — |
|  | Polymer B (molecular weight 1,500,000, Sp value 10.0 $^{1/2}$/cm$^{3/2}$) | — | — | — | — |
|  | Polymer C (molecular weight 360,000, Sp value 10.5 $^{1/2}$/cm$^{3/2}$) | — | — | — | — |
|  | Polymer D (molecular weight 100,000, Sp value 10.0 $^{1/2}$/cm$^{3/2}$) | — | 10 | — | — |
|  | Polymer E (molecular weight 1,200,000, Sp value 13.3 $^{1/2}$/cm$^{3/2}$) | — | — | — | — |
|  | Polymer F (molecular weight 1,700,000–2,200,000, Sp value 9.4 $^{1/2}$/cm$^{3/2}$) | — | — | — | — |
|  | Polyvinyl formal resin ("Vinylec" K) | — | — | 7 | 10 |
|  | Component [C] hardening agent and hardening accelerator | | | | |
|  | Dicyandiamide | 4 | 4 | 4 | 4 |
|  | DCMU | 4 | 4 | 4 | 4 |
| Dynamic viscoelasticity of resin | 25° C. Complex viscosity η$^s$ (Pa · s) | 15200 | 16100 | 70600 | 88400 |
|  | Storage modulus G' (Pa) | 12300 | 15400 | 54200 | 84400 |
|  | 50° C. Complex viscosity η$^s$ (Pa · s) | 133 | 152 | 877 | 1270 |
|  | Storage modulus G' (Pa) | 19 | 54 | 762 | 1540 |
|  | G'/ η‡ | 0.1 | 0.4 | 0.9 | 1.2 |
| Properties of prepreg | Tackiness T (MPa) | 0.04 | 0.05 | 0.14 | 0.16 |
|  | Drapability D (GPa$^{-1}$) | 0.125 | 0.111 | 0.037 | 0.013 |
|  | Mandrel windability index | 326 | 298 | 243 | 266 |

What is claimed is:

1. A prepreg comprising 1) reinforcing fibers and 2) a resin composition comprising:
   a thermosetting resin as component A; and
   a thermoplastic resin having a weight average molecular weight of about 360,000 to about 1,700,000 as component B, wherein said component B is dissolved in said component A.

2. The prepreg according to claim 1, having a complex viscosity $\eta^*$ in a dynamic viscoelasticity measurement at a measuring frequency of 0.5 Hz at 50° C. about 200 to about 2,000 Pa·s, and a storage modulus G' of about 100 to about 2,000 Pa.

3. The prepreg according to claim 2, wherein the complex viscosity $\eta^*$ (Pa·s) and the storage modulus G' (Pa) satisfy the following relationship:

$$0.9 \leq G'/\eta^* \leq 2.0.$$

4. The prepreg according to claim 1, wherein the difference in absolute value between a solubility parameter SP value of the thermosetting resin and that of the thermoplastic resin is about 0 to about 2.

5. The prepreg according to claim 1, wherein the thermoplastic resin has a glass transition temperature of about 80° C. or higher or a melting point of about 80° C. or higher.

6. The prepreg according to claim 1, wherein the thermoplastic resin is a polymer obtained by polymerizing a vinyl monomer.

7. The prepreg according to claim 6, wherein about 50 mol % or more of the vinyl monomer is (meth)acrylate.

8. The prepreg according to claim 7, wherein 50 mol % or more of said (meth)acrylate is methyl(meth)acrylate.

9. The prepreg according to claim 6, wherein about 50 mol % or more of the vinyl monomer is vinylpyrrolidone.

10. The prepreg according to claim 1, wherein the thermoplastic resin is a polyether.

11. The prepreg according to claim 10, wherein the polyether is an polyalkylene ether.

12. The prepreg according to claim 1, wherein the thermoplastic resin is contained in an amount of about 0.1 to about 20 parts by weight per 100 parts by weight of the thermosetting resin.

13. The prepreg according to claim 1, wherein the thermoplastic resin is contained in an amount of about 0.1 to about 10 parts by weight per 100 parts by weight of the thermosetting resin.

14. The prepreg according to claim 1, wherein the thermosetting resin is selected from the group consisting of epoxy resins, unsaturated polyester resins, vinyl ester resins, phenol resins, melamine resin, benzoguanamine resin, urea resin, silicone resins, maleimide resins, cyanate resins, resins obtained by polymerizing a maleimide resin and a cyanate resin, and their mixtures.

15. The prepreg according to claim 1, having a tackiness T of about 0.05 to about 0.20 MPa, and a drapability D of about 0.01 to about 0.1 GPa$^{-1}$, the relation between the tackiness T and the drapability D satisfying the following formula:

$$2.3 \times 10^{-3} \leq D \cdot T \leq 1.2 \times 10^{-2}.$$

16. The prepreg according to claim 1, wherein said reinforcing fibers are at least one kind of fibers selected from the group consisting of carbon fibers, aromatic polyamide fibers, glass fibers, silicon carbide fibers, boron fibers, alumina fibers and stainless steel fibers.

17. The prepreg according to claim 1, wherein the reinforcing fibers are carbon fibers having an elastic modulus of about 200 GPa or more.

18. The prepreg according to claim 1 having a windability index of about 0 to about 100.

19. A fiber reinforced composite comprising a cured product obtained from the prepreg defined in claim 1.

20. A prepreg comprising 1) reinforcing fibers and 2) a resin composition comprising:
   a thermosetting resin selected from the group consisting of epoxy resins, unsaturated polyester resins, vinyl ester resins, phenol resins, melamine resin, benzoguanamine resin, urea resin, silicone resins, maleimide resins, cyanate resins, resins obtained by polymerizing a maleimide resin and a cyanate resin, and their mixtures; and
   about 0.1 to about 20 parts by weight, based on 100 parts by weight of said thermosetting resin, of a thermoplastic resin having a molecular weight about 200,000 to about 1,700,000 and being selected from the group consisting of polymers obtained by polymerizing a vinyl monomer, polyethers, polyamides, polyurethane and polyurea, dissolved in said thermosetting resin
   said composition having a complex viscosity $\eta^*$ in a dynamic viscoelasticity measurement at a measuring frequency of 0.5 Hz at 50° C. of about 200 to about 2,000 Pa·s, and a storage modulus G' of about 100 to about 2,000 Pa, and wherein the complex viscosity $\eta^*$ (Pa·s) and the storage modulus G' (Pa) satisfy the following relationship:

$$0.9 \leq G'/\eta^* \leq 2.0.$$

21. A prepreg comprising:
   a) a matrix resin composition including a thermosetting resin selected from the group consisting of epoxy resins, unsaturated polyester resins, vinyl ester resins, phenol resins, melamine resin, benzoguanamine resin, urea resin, silicone resins, maleimide resins, cyanate resins, resins obtained by preliminarily polymerizing a maleimide resin and a cyanate resin, and their mixtures; and
   about 0.1 to about 20 parts by weight, based on 100 parts by weight of said thermosetting resin, of a thermoplastic resin having a molecular weight about 200,000 to about 1,700,000 and being selected from the group consisting of polymers obtained by polymerizing a vinyl monomer, polyethers, polyamides, polyurethane and polyurea, dissolved in said thermosetting resin
   said composition having a complex viscosity $\eta^*$ in a dynamic viscoelasticity measurement at a measuring frequency of 0.5 Hz at 50° C. of about 200 to about 2,000 Pa·s, and a storage modulus G' of about 100 to about 2,000 Pa, and wherein the complex viscosity $\eta^*$ (Pa·s) and the storage modulus G' (Pa) satisfy the following relationship:

$$0.9 \leq G'/\eta^* \leq 2.0;\text{ and}$$

b) about 60 to about 90 wt %, based on the wt % of said matrix resin composition, of reinforcing fibers selected from the group consisting of carbon fibers, aromatic polyamide fibers, glass fibers, silicon carbide fibers, boron fibers, alumina fibers and stainless steel fibers, impregnated by said matrix resin composition,
   said prepreg having a tackiness T of about 0.05 to about 0.20 MPa, a drapability D of about 0.01 to about 0.1 GPa$^{-1}$, the relation between the tackiness T and the drapability D satisfying the following formula:

$2.3 \times 10^{-3} \leq D \cdot T \leq 1.2 \times 10^{-2}$, and a windability index of about 0 to about 100.

22. A fiber reinforced composite comprising a cured product obtained from the prepreg defined in claim 21.

23. A prepreg comprising 1) reinforcing fibers and 2) a resin composition comprising:
 a thermosetting resin as component A; and
 a thermoplastic resin having a weight average molecular weight of about 360,000 to about 1,700,000 as component B;
 wherein said component B is dissolved in said component A and the difference in absolute value between a solubility parameter SP value of said thermosetting resin and that of said thermoplastic resin is about 0 to about 2.

24. A prepreg comprising 1) reinforcing fibers and 2) a resin composition comprising:
 a thermosetting resin as component A; and
 a thermoplastic resin having a weight average molecular weight of about 360,000 to about 1,700,000 as component B;
 wherein said thermosetting resin is selected from the group consisting of epoxy resins, unsaturated polyester resins, vinyl ester resins, phenol resins, maleimide resins and polyimide resins, and their mixtures, said component B is dissolved in said component A and the difference in absolute value between a solubility parameter SP value of said thermosetting resin and that of said thermoplastic resin is about 0 to about 2.

25. A prepreg comprising 1) reinforcing fibers and 2) a resin composition comprising:
 a thermosetting resin as component A; and
 a thermoplastic resin having a weight average molecular weight of about 360,000 to about 1,700,000 as component B;
 wherein said thermosetting resin is selected from the group consisting of epoxy resins, unsaturated polyester resins, vinyl ester resins, phenol resins, maleimide resins and polyimide resins, and their mixtures, said component B is dissolved in said component A and the difference in absolute value between a solubility parameter SP value of said thermosetting resin and that of said thermoplastic resin is about 0 to about 2, and
 said resin composition having a complex viscosity $\eta^*$ in a dynamic viscoelasticity measurement at a measuring frequency of 0.5 Hz at 50° C. about 200 to about 2,000 Pa·s, and a storage modulus G' of about 100 to about 2,000 Pa, and wherein the complex viscosity $\eta^*$(Pa·s) and the storage modulus G' (Pa) satisfy the following relationship:

$0.9 \leq G'/\eta^* \leq 2.0$.

26. A prepreg comprising 1) reinforcing fibers and 2) a resin composition comprising:
 a thermosetting resin as component A; and
 a thermoplastic resin having a weight average molecular weight of about 360,000 to about 1,700,000 as component B;
 wherein said thermosetting resin is selected from the group consisting of epoxy resins, unsaturated polyester resins, vinyl ester resins, phenol resins, maleimide resins and polyimide resins, and their mixtures,
 said thermoplastic resin having a glass transition temperature of about 80° C. or higher or a melting point of about 80° C. or higher, and
 said component B is dissolved in said component A and the difference in absolute value between a solubility parameter SP value of said thermosetting resin and that of said thermoplastic resin is about 0 to about 2, and
 about 0.1 to about 20 parts by weight, based on 100 parts by weight of said thermosetting resin, of said thermoplastic resin,
 said resin composition having a complex viscosity $\eta^*$ in a dynamic viscoelasticity measurement at a measuring frequency of 0.5 Hz at 50° C. about 200 to about 2,000 Pa·s, and a storage modulus G' of about 100 to about 2,000 Pa, and wherein the complex viscosity $\eta^*$(Pa·s) and the storage modulus G' (Pa) satisfy the following relationship:

$0.9 \leq G'/\eta^* \leq 2.0$.

27. A prepreg comprising 1) reinforcing fibers and 2) a resin composition comprising:
 a thermosetting resin as component A; and
 a thermoplastic resin having a weight average molecular weight of about 360,000 to about 1,700,000 as component B;
 wherein said thermosetting resin being selected from the group consisting of epoxy resins, unsaturated polyester resins, vinyl ester resins, phenol resins, maleimide resins and polyimide resins, and their mixtures,
 said thermoplastic resin having a glass transition temperature of about 80° C. or higher or a melting point of about 80° C. or higher, and being selected from the group consisting of polymers obtained by polymerizing a vinyl monomer and polyethers,
 said component B is dissolved in said component A and the difference in absolute value between a solubility parameter SP value of said thermosetting resin and that of said thermoplastic resin is about 0 to about 2, and
 about 0.1 to about 20 parts by weight, based on 100 parts by weight of said thermosetting resin, of said thermoplastic resin,
 said resin composition having a complex viscosity $\eta^*$ in a dynamic viscoelasticity measurement at a measuring frequency of 0.5 Hz at 50° C. about 200 to about 2,000 Pa·s, and a storage modulus G' of about 100 to about 2,000 Pa, and wherein the complex viscosity $\eta^*$(Pa·s) and the storage modulus G' (Pa) satisfy the following relationship:

$0.9 \leq G'/\eta^* \leq 2.0$.

\* \* \* \* \*